INVENTORS.
Robert L. Craiglow
William C. Post

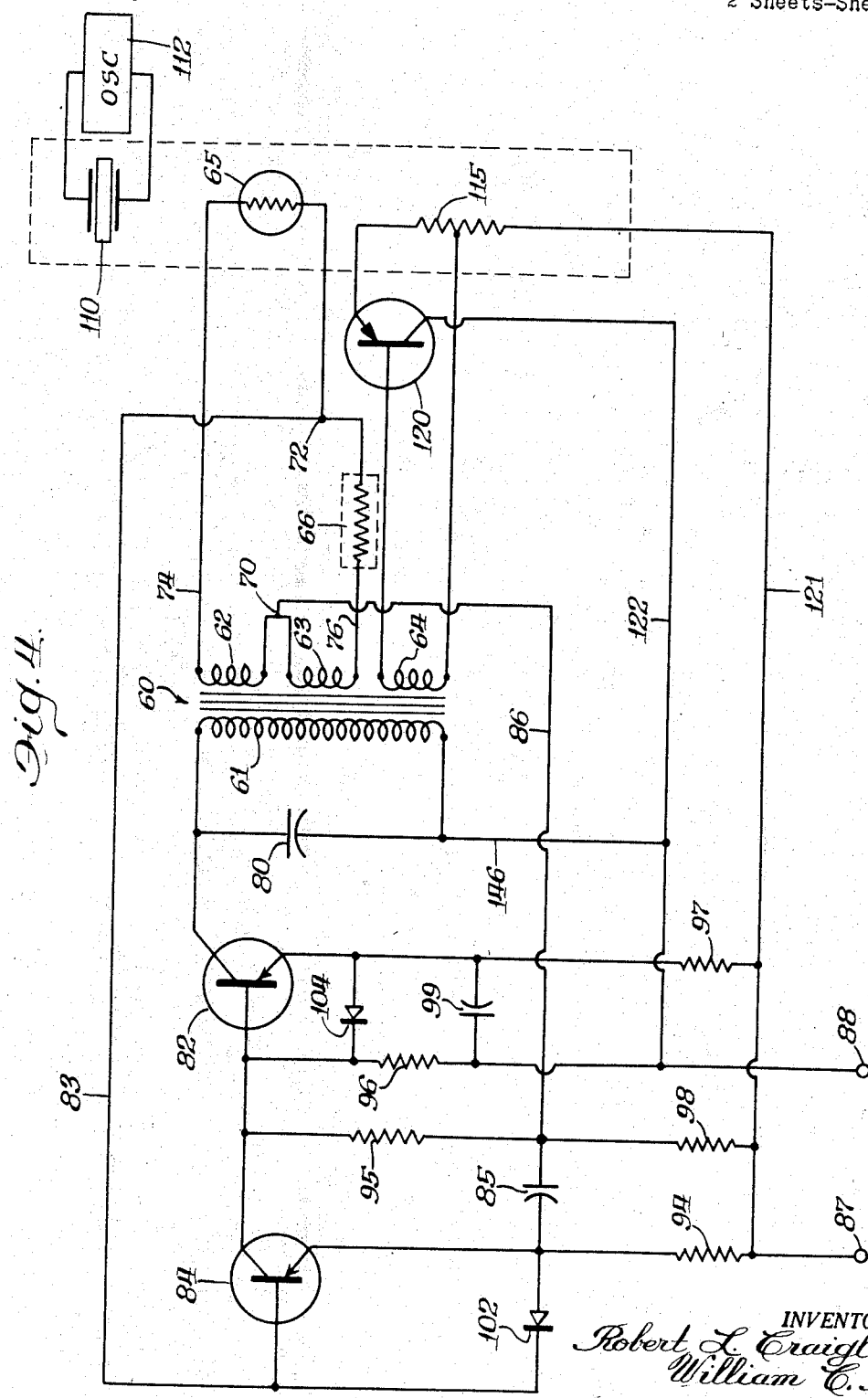

United States Patent Office 3,322,982
Patented May 30, 1967

3,322,982
TEMPERATURE CONTROL OVEN
Robert L. Craiglow, Cedar Rapids, Iowa, and William C. Post, San Diego, Calif., assignors to Motorola, Inc., Chicago, Ill., a corporation of Illinois
Filed Apr. 16, 1963, Ser. No. 273,331
9 Claims. (Cl. 310—8.9)

This invention relates generally to an electrically heated oven and more particularly to an oven and associated controls for maintaining the temperature of a piezoelectric crystal substantially constant and independent of ambient temperature variations.

There are many applications where it is desirable to maintain the temperature of an electronic component such as a piezoelectric crystal at a constant predetermined temperature. Such is the case, for example, in communication systems where it is often necessary to provide a stable reference frequency signal from a crystal controlled oscillator. The crystal is enclosed in an oven and a heater such as an electrical resistance heater and a temperature control circuit are provided to supply power to the heater in the manner to maintain a predetermined temperature within the oven.

Precise temperature control and hence maximum frequency stability requires instantaneous incremental changes of power supplied to the heating element in response to temperature changes within the oven. It is further desirable to provide balanced heat loss paths from the sensing element to ambient and from the heating element to ambient so that the oven control may function independently of ambient temperature changes, and advantageous in many systems to provide an all-electronic oven temperature controller which employs simplified circuitry and which may be readily transistorized for a compact unit which utilizes a minimum of power drain.

It is therefore an object of the present invention to provide an improved temperature control oven for electronic circuit components such as piezoelectric crystals and the like.

A further object is to provide a thermally efficient oven utilizing a proportional type temperature control circuit to maintain an electrical component at a constant temperature with a minimum of power consumption.

Another object is to provide an electrically heated oven which can be temperature controlled within precise limits independent of ambient temperature variations.

A feature of the invention is the provision of a proportional-type temperature control circuit for use with a compact, thermally efficient oven unit, which circuit includes a self-excited bridge oscillator having a heat sensing device connected as one arm of the bridge and current control means responsive to bridge excitation to maintain the temperature of the oven at a constant level as determined by the heat sensing device.

Still another feature is the provision of an adjustable heat loss path between the heat sensing device and ambient so that it is possible to compensate for differences in heat losses to ambient between the heat sensing device and the heating elements, thereby maintaining the constant temperature in the oven independent of ambient temperature variations.

Further objects, features and attending advantages of the invention will be apparent from the consideration of the following description when taken in conjunction with the accompanying drawings, in which:

FIG. 4 is a schematic drawing of the temperature control circuit for use with the oven of the present invention.

In practicing the invention there is provided an enclosed housing having a cavity forming an oven chamber for containing a piezoelectric crystal or other electronic components which is to be maintained at a constant temperature. A resistance wire heating element surrounds a portion of the cavity and a heat sensing device such as a negative coefficient thermistor is positioned in close proximity to the oven chamber. The thermistor is connected as one arm of a bridge included in a proportional type temperature control circuit, with the bridge approaching balance when the resistive value of the thermistor indicates a predetermined temperature. The control circuit further includes a feedback arrangement to provide self-excited oscillations for the bridge, and unbalance resulting from an increase of the resistive value of the thermistor, indicating a temperature drop below a predetermined value, provides a feedback signal to increase bridge excitation. A circuit responsive to bridge excitation including a control device such as a power transistor supplies current to the resistive heating element for the oven chamber. Increased bridge unbalance, indicating that the thermistor has called for more heat, increases the current to the heating element to bring the temperature sensed by the thermistor to the value needed for the bridge to approach balance.

To compensate for differences in thermal paths between the thermistor and the heating element, a movable metallic mass is provided in close proximity to the thermistor. This mass is in thermal contact with the housing of the oven and its position relative to the thermistor may be adjusted so that heat loss from the thermistor to ambient and from the heating element to ambient are conducted over balanced paths. This allows the temperature of the oven to be maintained substantially constant independent of ambient temperature variations. By making the heat loss path from the thermistor to ambient readily adjustable, it is possible to compensate for manufacturing tolerances when the ovens are produced in large quantities so that extremely accurate temperature control ovens may be economically produced without the requirement of close manufacturing tolerances.

Figure 1:
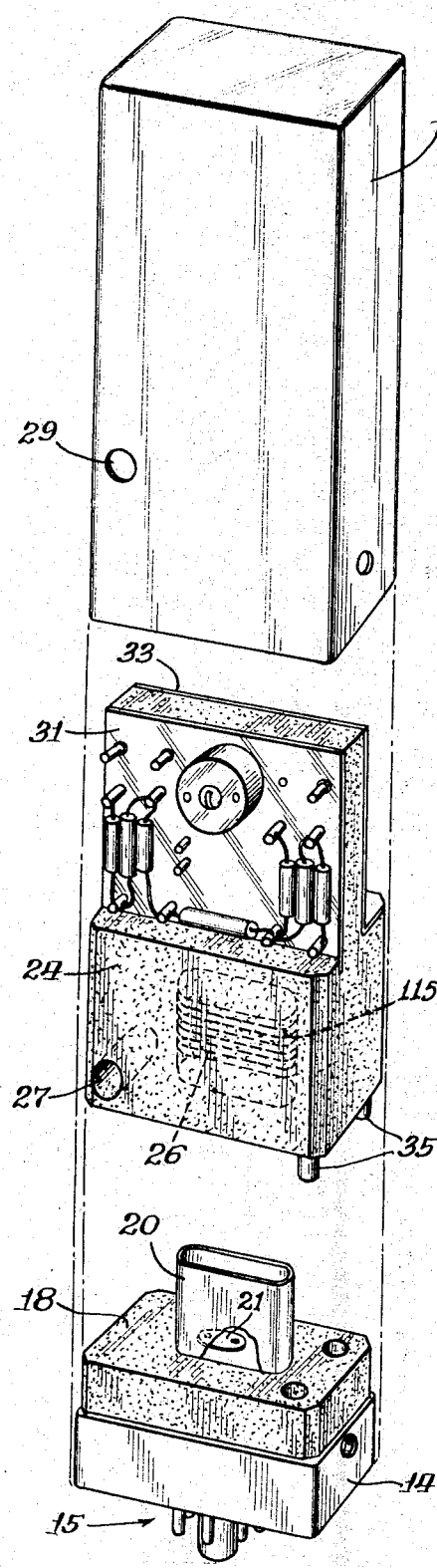
FIG. 1 is an exploded view of an oven unit according to the present invention.

Referring now to FIG. 1, housing 12 provides an overall metal enclosure which acts as a heat sink as well as a cover for protecting the internal parts of the oven. A mating base portion 14 is provided with an octal plug shown generally at 15 so that the oven may be conveniently inserted into a socket for mechanical mounting and for providing the necessary electrical connections.

Base portion 14 contains a body of insulating material 18 such as cured polyurethane foam. Insulating body 18 supports a cavity 20, formed from highly thermal conductive metal such as copper. A suitable socket 21 for receiving an electrical component such as a piezoelectric crystal is located in cavity 20 and leads are provided therefrom to octal plug 15 for connection to an external circuit such as a radio frequency oscillator.

A second insulating body 24, adapted to be received by outer housing 12, surrounds cavity 26 to provide mechanical support and thermal insulation. Cavity 26 is of the same material as cavity 20 and of the same general configuration. The bottom portion of cavity 26 is opened and in substantial alignment with cavity 20, and its interior dimensions are slightly larger than the exterior dimensions of cavity 20 so that in an assembled condition cavity 26 fits coaxially over cavity 20 to form the oven chamber. There is further provided in insulating body 24 a horizontally extending bore 27 which, when in assembled condition, opens into hole 29 of housing 12.

A heater winding 115 of resistance wire such as Nichrome or Cupron is wound around exterior walls of cavity 26. Preferably this is a single layer winding having the ends thereof extending to circuit board 31 for connection to the temperature control circuit of the oven. In addition, a bead thermistor such as a negative resistance thermistor is disposed on the end of cavity 26 which is in close proximity to bore 27 in insulating body 24. The leads of bead thermistor also extend through insulating body 24 for connection to electrical circuit board 31.

A circuit board 31, of insulating material, is positioned on a cutout portion of insulating body 24 for location of circuit components of the temperature control circuit. A metallic base plate 33 is located in a cutout portion of insulating body 24 on a side opposite to insulating board 31. Relatively large mass mounting studs (not shown) extend between base plate 33 and the walls of enclosure 12 to provide good thermal conduction therebetween. Thus, the base plate 33 provides a heat sink for the transistors utilized in the temperature control circuit contained within the oven. Pin members 35 extend from the bottom of insulating body 24 to conductively lined holes in insulating body 18 to provide an electrical circuit for the D.C. operating voltages of the temperature control circuit applied to octal plug 15.

When assembled, insulating body 24, carrying circuit board 31 and base plate 33, fits into housing 12 and is secured therein by mounting screws extending through the back surface of housing 12 and engaging mounting studs on base plate 33 (not shown). Circuit board 31 and base plate 33 support the circuit components of the temperature control circuit of FIG. 4, with base plate 33 in thermal contact with housing 12, providing a heat sink for the transistors of the circuit of FIG. 4. Cavity 20 fits coaxially into cavity 26 to form an oven chamber which is only large enough to contain a crystal inserted into cavity 20, with the chamber being well insulated by body 24.

Figure 2:
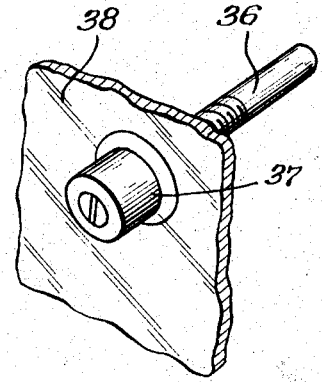
FIG. 2 is a representation of the adjustable heat loss compensator for use with the present invention.

In an assembled oven a metallic mass is inserted in bore 27 through hole 29 to provide a heat loss path for the bead thermistor positioned next to cavity 26 in insulating body 24. This mass is in thermal contact with housing 12, and hence the ambient of the oven, and may be adjusted in proximity with the thermistor so that heat losses from the thermistor to ambient and from the heating element to ambient are conducted over balanced paths, allowing the temperature of the oven to remain constant independent of ambient temperature variations. Structural embodiments of adjustable metallic masses to provide this function are illustrated in enlarged fashion in FIGS. 2 and 3.

The metallic mass may take the form of an elongated metallic member 36 having a body portion 37 in thermal contact with an outside surface 38 such as the main housing or enclosure of the oven unit. Surface 38 is accordingly subjected to the ambient temperature variations of the entire oven assembly. Body portion 37 is conveniently a bushing secured to surface 38 and internally threaded to receive a threaded portion of member 36. Thus, the proximity of the end of member 36 to the thermistor may be adjusted to balance its heat loss path to ambient.

Figure 3:
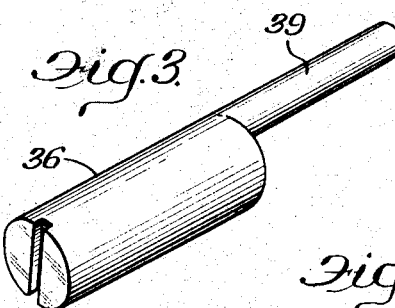
FIGS. 3, 3a and 3b illustrate an alternate embodiment of the adjustable heat loss compensator of the present invention.
Figure 3A:
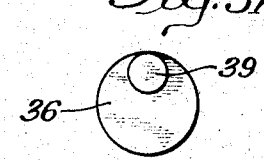
Figure 3B:
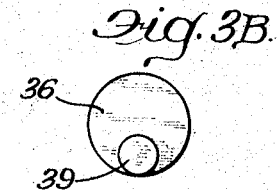

In the embodiment of FIG. 3, metallic member 36 is provided with an eccentrically extending arm 39. When rotated, arm 39 follows an eccentric path, as illustrated in FIGS. 3a and 3b, so that its proximity to the heat sensing thermistor may be varied.

The proportional type temperature controller of the present invention is shown in FIG. 4. Transformer 60 has primary winding 61 and secondary windings 62, 63 and 64. Windings 62 and 63 are connected as two arms of a bridge circuit, with thermistor 65 and the resistance shown at 66 comprising the other two arms thereof. Resistance 66 may comprise the resistance of winding 63 when wound of suitable resistance wire, or may be a separate externally connected resistor. Balance for a given value of thermistor resistance and hence a predetermined temperature may be achieved by adjusting the total number of turns of winding 62 or by selectively choosing the value of an external resistor 66. Where resistance 66 is comprised of the resistance of winding 63 changing its value by changing the number of turns of the winding does not effect bridge balance since there is a proportionate change in the voltage induced in this winding.

Junction point 70 between one end of each of windings 62 and 63 and junction point 72 between one end of resistor 66 and thermistor 65 form one pair of opposite corners of the bridge circuit, while lead 74 connecting thermistor 65 to the other end of winding 62 and lead 76 connecting resistor 66 to the other end of winding 63 provides the other pair of opposite corners of the bridge. Signals induced in windings 62 and 63 by an alternating current supplied to primary winding 61 energize the bridge and the signal developed between the junction points or bridge corners 70 and 72 provide an output indicative of bridge unbalance.

Capacitor 80 is connected in parallel with primary winding 61 of transformer 60 to provide a high Q tuned circuit for coupling to the collector electrode of bridge energizing transistor 82. Typically this tuned circuit may be resonant at an audio frequency in the order of 3 kc. The input base electrode of transistor 82 receives a driving signal from the output collector electrode of transistor 84. The base electrode of transistor 84 is connected by lead 83 to the junction point or bridge corner 72. The emitter electrode of transistor 84 is coupled by capacitor 85 and lead 86 to the junction point or bridge corner 70. Thus, there is provided an alternating current signal path coupling the base and emitter electrodes of transistor 84 across output corners 70 and 72 of the bridge. This provides the feedback for exciting the bridge with increased unbalance.

This feedback signal is amplified by transistor 84 and coupled to the input base of transistor 82 to be subsequently amplified and supplied as energization pulses for the tuned circuit including capacitor 80 and primary winding 61 of transformer 60. The tuned output of transistor 84 thus produces oscillations of a predetermined frequency to energize the bridge input windings 62 and 63. These oscillations are coupled back to the input of transistor 84 in the presence of bridge unbalance. By proper phasing of the bridge this feedback is regenerative to increase the amplitude of oscillations supplied to the input of the bridge as it becomes unbalanced to a greater degree.

Transistor 84 is direct coupled to transistor 82 and stable biasing is provided in a manner which utilizes a minimum of circuit components. Resistor 95 has one end connected to the junction of the base electrode of transistor 82 and the collector electrode of transistor 84. The other end of resistor 95 is bypassed to the emitter electrode of transistor 84 by capacitor 85. Operating voltages for cascaded transistors 82 and 84 are supplied by connecting a D.C. voltage to terminals 87 and 88. Resistor 96, connected to terminal 88, supplies a negative voltage to both the collector electrode of transistor 84 and the base electrode of transistor 82. Resistor 97 connects the emitter electrode of transistor 82 to the positive input terminal. Resistor 98 connects positive input terminal 87 to the junction of capacitor 85 and resistor 95, while resistor 94 connects terminal 87 to the emitter electrode of transistor 84. Base bias for transistor 84 is derived from the junction point between resistors 95 and 98, connected through secondary winding 63 by leads 83 and 86 and resistor 66. Collector voltage for transistor 82 is supplied through winding 61, tied to negative input terminal 88. Capacitor 99 provides emitter to base bypass for transistor 82. Typical values for the biasing resistors associated with transistors 82 and 84 are:

| | Ohms |
|---|---|
| Resistor 94 | 6800 |
| Resistor 95 | 10,000 |
| Resistor 96 | 4700 |
| Resistor 97 | 2700 |
| Resistor 98 | 22,000 |

To prevent a large reverse bias from occurring between the base and emitter electrodes of both transistors 82 and 84 in the presence of large driving signals which tend to cause a blocking condition in the circuit, diodes 102 and 104 are connected between the emitter and base electrodes of these transistors. These diodes tend to bypass large input current pulses which may be developed across the emitter resistors of these two transistors as a result of rectification by the base to emitter junction so that signals developed across the emitter resistor are due only to input signals rather than current gain introduced by the transistor.

Crystal 110, associated with RF oscillator circuit 112, is contained in the oven chamber, which is surrounded by a resistance heater winding 115. Themistor 65 is in close physical contact with the oven chamber and when connected as one arm of the above-described bridge circuit current is supplied to heater winding 115 to maintain the system in a condition which approaches bridge balance. To this end, current control transistor 120 is connected in the emitter follower configuration with heater winding 115 in series with its emitter electrode. D.C. operating voltages for transistor 120 is from terminals 87 and 88 on leads 121 and 122, respectively. Auxiliary winding 64 on transformer 60, providing a control signal proportional to the amplitude of bridge energization oscillations, is coupled between the base electrode of transistor 120 and a tap point on heater winding 115. The tap point is selected to provide thermal stability by means of feedback to the base electrode of transistor 64 and to prevent thermal runaway. A series of A.C. current pulses are supplied to heater winding 115 at the frenquency established by the tuned output of transistor 82 to provide R.M.S. heating in proportion to bridge unbalance.

As more heat is supplied to the oven chamber, there is a corresponding change in the resistivity of thermistor 65 to bring the bridge back towards balance. As the bridge approaches the balance, the feedback signal supplied to transistor 84 decreases, with a corresponding decrease in bridge energization. As the oven chamber cools in the presence of a lower ambient temperature, thermistor 65 produces further bridge unbalance to call for more heat, as supplied to heater winding 115 by transistor 120. When the ambient temperature is the same as that temperature at which the output chamber is to be maintained, bridge unbalance is minimized and no further current is supplied to heater winding 115. Proper phasing of the bridge insures that regenerative feedback is supplied for unbalance in one direction only, and overheating of the oven chamber does not result in increased bridge energization. Oven overheating may also be prevented by selecting thermistor 55 to provide bridge balance and slightly above the maximum anticipated ambient which the system is to be operated so that the bridge will either just balance or will just call for more heat as the oven chamber tends to cool in the presence of lower ambient temperatures.

The invention provides therefore a compact and thermally efficient oven for maintaining an electrical component at a constant temperature. The oven utilizes a proportional type temperature controller, which in conjunction with an over chamber only large enough to contain the element to be maintained at a constant temperature, minimizes power consumption. The temperature controller may be transistorized throughout with a minimum of circuit components and contains a bridge energizing transformer which may be readily adjusted to balance at a predetermined temperature. In addition, means are provided to balance heat losses from the heat sensing thermistor and the heating element so that constant temperature may be maintained independent of ambient temperature variations.

We claim:

1. A crystal oven including in combination, an outer housing, said outer housing having a removable closure portion, a first metallic cup insulatingly supported in said housing to form a cavity therein having an opening facing said closure portion, a second metallic cup insulatingly supported by said closure portion and having extending wall portions adapted to fit coaxially with said first cup portion to form an enclosed oven chamber, said second cup further having socket means to receive a piezoelectric crystal, a heating coil supported by and in thermal contact with the exterior surface of said first cup, a temperature control circuit for applying current to said heating coil, a bridge circuit in said temperature control circuit, heat sensing means disposed on the exterior surface of said first cup, said heat sensing means being connected as one arm of said bridge circuit, and heat conducting means in thermal contact with said outer housing and extending in close thermal proximity to said heat sensing means, with the proximity of said heat conducting means to said heat sensing means being adjustable to thereby provide balancing of heat loss paths of said heat sensing means and of said heating coil to the ambient temperature of said outer housing.

2. A temperature control oven for a piezoelectric crystal comprising, an outer housing, an oven chamber contained within said outer housing, said chamber including coaxially fitted metallic cups forming a cavity and having socket means therein for retaining the crystal, means supporting said chamber in thermal isolation in said housing, resistance heating means supported by said chamber and in thermal contact therewith, thermistor means in thermal contact with said chamber, a temperature control circuit within said outer housing, said temperature control circuit including a bridge circuit, means connecting said thermistor means at one arm of said bridge circuit, bridge excitation means providing oscillations for said bridge circuit and including feedback means coupled from the output of said bridge circuit to provide oscillations having an amplitude proportional to unbalance of said bridge circuit, and means for supplying current to said heating means in response to the amplitude of oscillations provided by said bridge excitation means, whereby current is supplied to said heating means in response to temperature detected by said thermistor means to maintain a constant temperature in said oven chamber.

3. In a temperature stabilized crystal oscillator, the combination including a housing, an oven chamber within said housing, said oven chamber comprising coaxially fitted cups forming a cavity having socket means therein for receiving a piezoelectric crystal, means supporting said oven chamber in thermal isolation in said housing, a resistance heater winding supported by said oven chamber and in thermal contact therewith, thermistor means in thermal contact with said oven chamber, means for connecting the crystal to the frequency determining portion of a radio frequency oscillator circuit, a temperature control circuit in said housing, said temperature control circuit including a bridge circuit with said thermistor means connected as one arm thereof and feedback circuit means for providing bridge energization oscillations in response to bridge unbalance produced by temperature changes in said chamber, and circuit means for supplying current to said heater winding in response to the amplitude of said bridge energization oscillations, whereby current is supplied to said heater winding in response to the temperature detected by said thermistor means to maintain a constant temperature in said oven chamber.

4. In a proportional temperature control circuit for use with a crystal oven having heater windings and thermistor means in thermal contact therewith, the combination including a transformer having a primary winding and first, second, and third secondary windings, resistor means, means connecting said thermistor means as one arm of a bridge circuit, with said first and second secondary windings and said resistor means all being connected as further arms of said bridge circuit, an amplifier circuit having an input and a tuned output coupled to said primary winding to provide oscillations for energization of said bridge circuit, feedback means responsive to bridge unbalance coupled to said amplifier input, said amplifier circuit exciting said bridge circuit with oscillations of an amplitude proportional to bridge unbalance, and circuit means including a current control amplifier having an input coupled to said third secondary winding and an output coupled to said heater windings, whereby current is supplied to said heater windings in response to the temperature sensed by said thermistor to maintain a constant temperature in the crystal oven.

5. An electrically heated oven including in combination, a housing, an enclosed chamber insulatingly supported in said housing, said chamber containing a socket for reception of a component to be maintained at a constant temperature, a heating coil in thermal contact with said chamber, a temperature control circuit for supplying current to said heating coil, said temperature control circuit including heat sensing means in thermal contact with said chamber, and adjustable heat conducting means in thermal contact with said housing and extending in close thermal proximity to said heat sensing means, with the proximity of said heat conducting means to said heat sensing means being adjustable to provide balancing of the heat loss paths of said heat sensing means and of said heating coil to the ambient temperature of said housing.

6. An electrically heated oven including in combination, a housing, means forming an enclosed chamber insulatingly supported in said housing, said chamber being adapted to receive a component to be maintained at a constant temperature, a heater winding in thermal contact with said chamber, heat sensing means in thermal contact with said chamber, a temperature control circuit for supplying current to said heater winding including a bridge circuit having said heat sensing means as one arm thereof, oscillator means coupled to said bridge circuit for supplying current thereto and including feedback means coupled from said bridge circuit so that the amplitude of oscillations produced are proportional to bridge unbalance, means coupled to said oscillator means for applying current to said heater winding which varies with the amplitude of the oscillations, and heat conducting means in thermal contact with said housing and extending in close thermal proximity to said heat sensing means, with the proximity of said heat conducting means to said heat sensing means being adjustable to thereby provide balancing of the heat loss paths of said heat sensing means and of said heater winding to the ambient temperature of said housing.

7. An electrically heated oven including in combination, a housing, means forming an enclosed chamber insulatingly supported in said housing, said chamber being adapted to receive a component to be maintained at a constant temperature, a heater winding in thermal contact with said chamber, a temperature control circuit for supplying current to said heater winding, said temperature control circuit including a transformer having a primary winding and first, second and third secondary windings, thermistor means in thermal contact with said chamber, said temperature control circuit including a bridge circuit having said first and second secondary windings and said thermistor means as arms thereof, oscillator means including amplifier means having an input and a tuned output coupled to said primary winding for supplying current thereto, and feedback means connecting said bridge circuit to said input of said amplifier means so that oscillations are produced in said primary winding having an amplitude proportional to bridge unbalance, means coupled to said third secondary winding for applying current to said heating coil which varies with the amplitude of oscillations in said primary winding, and heat conducting means in thermal contact with said housing and extending in close thermal proximity to said heat sensing means, with the proximity of said heat conducting means to said thermistor means being adjustable to thereby provide balancing of the heat loss paths of said thermistor means and of said heater winding to the ambient temperature of said housing.

8. A temperature control circuit for use with an electrically heated oven including a housing, an enclosed chamber for receiving a component to be maintained at a constant temperature, insulatingly supported in said housing, and a heating coil in thermal contact with said chamber, said temperature control circuit supplying current to said heating coil and including in combination, a transformer having a primary winding and first and second secondary windings, thermistor means in thermal contact with the chamber, a bridge circuit including said first and second secondary windings and said thermistor means as arms thereof, oscillator means for supplying current to said primary winding and including feedback means coupled said bridge circuit so that oscillations are produced in said primary winding having an amplitude proportional to bridge unbalance, means coupled to said transformer for applying current to the heating coil which varies with the amplitude of oscillations in said primary winding, and heat conducting means in thermal contact with the housing and extending in close thermal proximity to said heat sensing means, with the proximity of said heat conducting means to said heat sensing means being adjustable to thereby provide balancing of the heat loss paths of said heat sensing means and of the heating coil to the ambient temperature of the housing.

9. A temperature control enclosure for a piezoelectric crystal including in combination, a housing, an oven chamber including first and second metallic cup members in coaxial engagement, means insulatingly supporting said cup members in said housing, said chamber having a socket therein for reception of said crystal, resistance heating means supported by one of said cup members on the outer surface thereof and in thermal contact therewith, a temperature control circuit for applying current to said resistance heating means, a bridge circuit in said temperature control circuit, thermistor means positioned on the outer surface of one of said cup members, said thermistor means being connected as one arm of said bridge circuit, and adjustable heat conducting means in thermal contact with said housing and extending in close proximity to said thermistor means, said heat conducting means being adjustable to control the proximity thereof to said thermistor means to thereby provide balancing of the heat loss paths of said thermistor means and of said resistance heating means to the ambient temperature of said housing.

References Cited

UNITED STATES PATENTS

| | | | |
|---|---|---|---|
| 2,957,111 | 10/1960 | Schaeve | 219—503 |
| 2,967,924 | 1/1961 | Friend | 219—20 |
| 2,969,471 | 1/1961 | Schneider | 310—8.9 |
| 3,040,158 | 6/1962 | Cutler | 219—210 |
| 3,041,548 | 6/1962 | Keen | 219—210 |
| 3,079,516 | 2/1963 | Fisher | 310—8.9 |
| 3,107,285 | 10/1963 | Knapp | 219—20 |
| 3,161,759 | 12/1964 | Gambill | 219—501 |
| 3,252,109 | 5/1966 | White | 310—8.9 |

MILTON O. HIRSHFIELD, *Primary Examiner.*

A. J. ROSSI, J. D. MILLER, *Assistant Examiners.*